INVENTOR.
DANIEL SILVERMAN

June 17, 1969  D. SILVERMAN  3,450,225
ELASTIC-WAVE HOLOGRAPHY
Filed June 7, 1968  Sheet 2 of 4
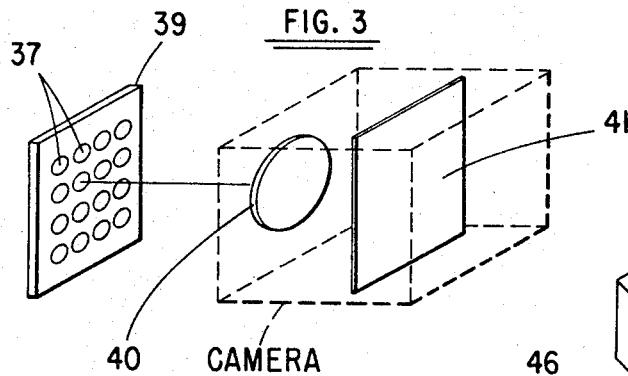
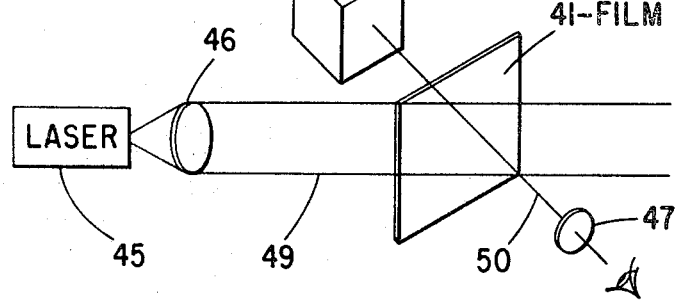
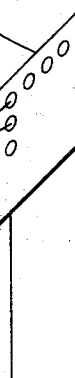
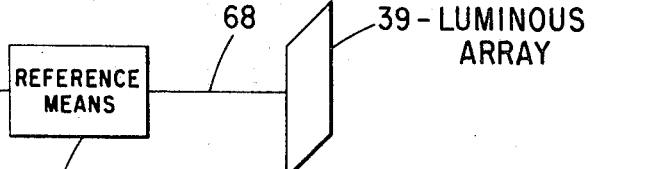
FIG. 7
INVENTOR.
DANIEL SILVERMAN
BY Newell Pottorf
ATTORNEY.

INVENTOR.
DANIEL SILVERMAN
BY
ATTORNEY.

United States Patent Office 3,450,225
Patented June 17, 1969

3,450,225
ELASTIC-WAVE HOLOGRAPHY
Daniel Silverman, Tulsa, Okla., assignor to Pan American Petroleum Corporation, Tulsa, Okla., a corporation of Delaware
Continuation-in-part of application Ser. No. 512,689, Dec. 9, 1965. This application June 7, 1968, Ser. No. 735,294
Int. Cl. H04b 13/00
U.S. Cl. 181—.5                    13 Claims

ABSTRACT OF THE DISCLOSURE

By an adaptation of holography, a remote object is visualized by causing it to emit (or strongly reflect from a nearby source) coherent, continuous, elastic waves that are received at an array of elastic-wave detectors. The outputs of part or all of the detectors are summed, and the summation signal is combined with each individual detector output as a constant-phase reference or bias. The biased detector outputs are translated into a corresponding pattern of luminous intensity that is converted into a photographic transparency, which is inserted in a beam of coherent light to reconstruct an image of the object.

CROSS-REFERENCES TO RELATED APPLICATIONS

This invention is a continuation-in-part of my copending applications Ser. No. 512,689, filed Dec. 9, 1965, now Patent No. 3,400,363, entitled "Wavelet Reconstruction Process for Sonic, Seismic and Radar Exploration," and Ser. No. 606,690, filed Jan. 3, 1967, entitled "Wavelet Reconstruction Process of Increased Resolution."

BACKGROUND OF THE INVENTION

Field of the invention

This invention is in the field of holographic imaging of three-dimensional objects by means of coherent elastic-wave energy. More particularly, it is concerned with the imaging of three-dimensional patterns of coherent elastic-wave sources, in which imaging the reference beam or wave-biasing function is generated at the reception location utilizing the received coherent-wave signals. The invention is particularly adapted to the employment of such elastic waves as acoustic, sonic and seismic waves.

Description of the prior art

As described in my above-mentioned copending applications, an object to be visualized is irradiated by a source of coherent elastic-wave radiation, simultaneously with irradiation of the receiving array by the same source. The lengths of paths by which the elastic-wave raditaion travels from the source to the object and thence to the receivers are about the same as the length of the path traveled by the reference beam from the source to the receivers, so as to maintain spatial coherence. Alternately, the receivers are irradiated by a nearby auxiliary souce maintained in synchronism with the distant primary source by some form of direct control-signal linkage; or the receiver-bias or phase-reference signal is applied to the receiver outputs in electrical form. If the object is at a great distance from the receivers and it is impractical to provide a reference beam or its equivalent, or if the intervening medium is not completely transparent to the elastic-wave energy, then there may be considerable attenuation, scattering and degeneration of the wave signals by the time they reach the receivers, with the possibility that the reflected and reference beams of wave energy may lose their coherence.

SUMMARY OF THE INVENTION

In the present invention, the object to be visualized is irradiated by elastic waves from a nearby continuously emitting, constant-frequency source; or an array of such sources that are coherent, or their equivalent, is placed on or close to the object at points characterizing the shape or surface of the object. For an array of sources, these are all provided with power or are driven from the same or synchronized power sources, so that their output elastic waves are coherent in time. These signals, emitted by the sources directly or reflected from nearby portions of the object, are detected at the distant receiving array. No effort is made to transmit a reference beam to the receiving array because of the attenuation, scattering, or loss of coherence that may result either from the distance of transmission or the imperfections of the intervening medium affecting its elastic-wave transparency. Instead, a reference signal is derived from the received waves by converting them to corresponding electrical signals and adding these electrical signals algebraically or vectorially to provide a resultant or summation electrical signal.

This summation signal now has the same frequency content as the received signals and a constant phase, assuming that the transmission has reached a steady state. By adding or combining this electrical summation signal separately with each of the electrical counterparts of the received signals, a corresponding plurality of biased received signals is obtained. These are used to control a corresponding array of luminous sources to provide a pattern of light intensity over an area which is a function of the pattern of received signals over the receiver array. This luminous pattern is recorded in such a way as to provide a hologram which can be viewed as a photographic transparency in a beam of coherent light to reconstruct an image of the object or of the pattern of sources characterizing it.

As to the nature of the object, it can be a characteristic patern or arrangement of a plurality of separate, coherent, elastic-wave sources, which need not necessarily be of the same frequency as long as all waves received from any one source directly or by reflection retain their spatial coherence. The object may be a structure which is highly reflective to elastic, coherent wave energy; or it may have highly efficient reflectors for such energy placed thereon to increase its reflectivity. Or, as has been previously indicated, the object may be simply one capable of diffracting and reflecting coherent, elastic-wave energy with the source or sources located so close to the object that the irradiation is of quite high intensity, producing reflected energy at a quite high level as compared to what it would be if the source were at some distance away or at the receiver location.

It is, accordingly, a primary object of this invention to record and holographically recreate an image of a distant or dim object irradiated by coherent, elastic waves from a source thereof, or an array of such sources, without the requirement of transmitting a reference beam of radiation, or an electrical signal representative of the frequency of the wave sources, to the receiving location. A further object of the invention is to use a plurality of sources of coherent, elastic waves of different frequency to holographically record and reconstruct images of an object irradiated by these sources or of the pattern of the sources characterizing the object.

BRIEF DESCRIPTION OF THE DRAWINGS

These and other objects, advantages and uses of the invention will be better understood by reference to the detailed description to follow, taken in conjunction with the accompanying drawings forming a part of this application. In these drawings.

FIGURES 3 and 4 show diagramatically the recording of a hologram and reconstruction of an image by coherent light;

FIGURE 7 is a schematic diagram of a further modification of the system of FIGURE 5 utilizing a plurality of different frequency sources;

DESCRIPTION OF THE PREFERRED EMBODIMENTS

Figure 1:
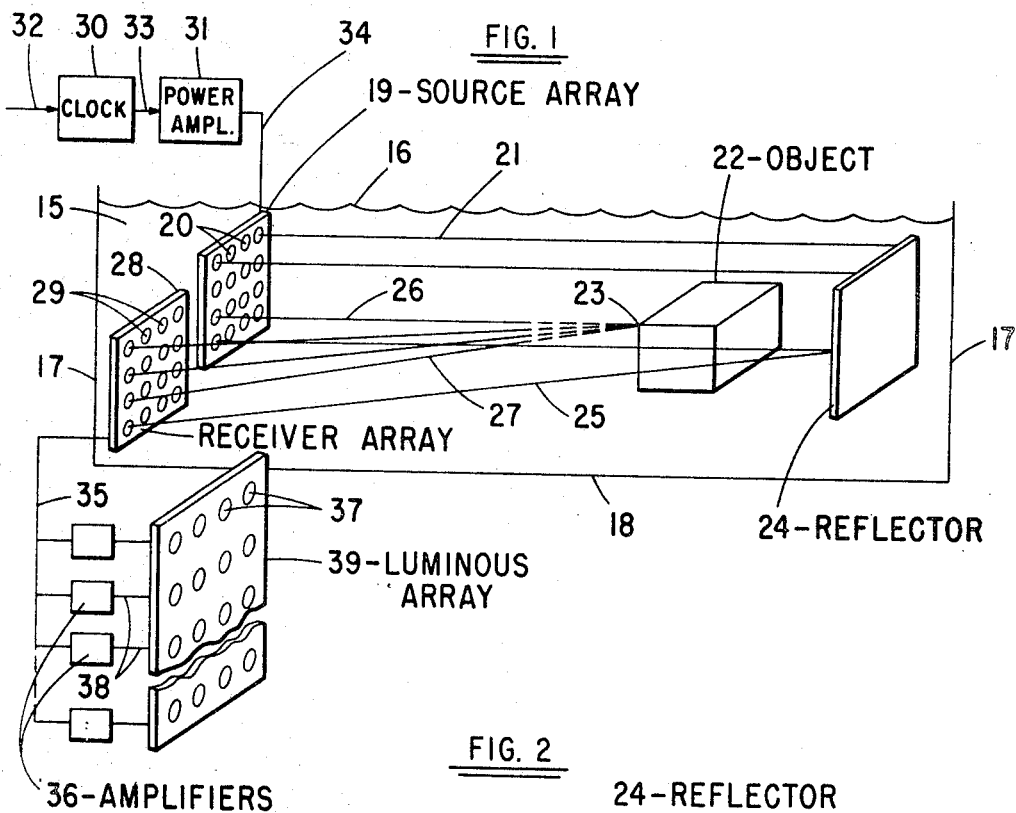
FIGURES 1 and 2 are respectively schematic perspective and plan views of a coherent-wave holographic imaging system as described in my copending application wherein the source and receiver arrays are relatively close together and distance to the object is not a factor.

Referring now to the drawings in detail, FIGURES 1 to 4 inclusive correspond to the same figures of my above co-pending application Ser. No. 512,689, filed Dec. 9, 1965, and will be described to provide background for the present invention. These figures show the principles of the invention in terms of elastic-wave propagation in a liquid medium such as sound waves in water. The invention is, of course, not limited thereto but is applicable to systems employing coherent elastic waves in gases, liquids, or solids.

Referring particularly to FIGURE 1, a body of water 15 is shown as having a surface 16, lateral boundaries 17, and a bottom 18. Although these boundaries are shown close to the apparatus in the drawing, they would in practice be at such distances as to minimize the effect of boundary reflections in the body of water 15 as compared with reflections from the object to be visualized, here shown as a three-dimensional object 22.

Immersed in water 15 at some distance from object 22 is a source 19 of coherent sonic energy formed of a plurality of transducers 20 mounted in a plane supporting framework and arranged in a regularly spaced rectangular pattern or grid. Each of transducers 20 converts electrical signals supplied to it into corresponding sonic waves in the water 15. These transducers may be electro-dynamic, piezo-electric, or similar devices such as are commercially available for underwater sonic signaling. As the sonic frequency must be maintained very closely constant, it is in practice provided by a quartz crystal-controlled device 30 or similar well-known clock-signal source supplied with electrical power over a lead 32, the constant frequency electrical output signal being taken by lead 33 to a power amplifier 31 and thence by leads 34 to each of the individual transducer units 20.

The detector or receiver array 28 is preferably formed of a plurality of individual receiving transducers 29 for converting sonic to electrical energy, the units 29 like transducers 20 being preferably regularly spaced apart in a rectangular frame or grid. Each individual transducer unit 29 is connected by a lead of a cable 35 to a corresponding individual amplifier 36 and thence by a lead 38 to a corresponding individual luminous source 37 of a source array 39. Each luminous source 37 can be a glow-tube, cathode-ray device, galvanometer with appropriate mask, or the like, as is well known in the art, provides over a small area an intensity of light which varies directly with the output voltage of the corresponding one of detectors 29, which voltage varies directly with the amplitude and polarity of the varying sonic pressure at corresponding positions in water 15. Like source units 20 and receiver units 29, luminous sources 37 are arranged with regular spacings in the rectangular array or grid 39, the spacings corresponding, with some desired proportional scale, to the spacings of transducer units 29. Thus, the pattern of light intensity distributed over the entire array 39 of luminous sources 37 represents to any desired linear scale the intensity pattern of sonic pressure in water 15 at the plane of detector array 28.

While rectangular arrays of fixed receiving transducers and luminous sources are shown, as my copending application S.N. 606,690 makes clear, any lesser number of transducers and luminous sources could be used and scanned to cover the same area occupied by the arrays. In the limit, of course, a single receiver or luminous spot analogous to a flying-spot scanner, or display, can be employed.

As is shown in FIGURE 3, the pattern of light intensity on array 39 is imaged by a lens 40 and recorded in conventional form on a photographic sheet or film 41. Since the pressure variations in water 15 are alternating in form, a bias voltage is required in amplifiers 36 to translate this to a varying unidirectional voltage suitable for application to luminous sources 37. The photographic exposure of film 41 must be such as to take this variation into account, either by making a very short exposure at a peak of intensity of the luminous array 39 or, by restricting the aperture of lens 40, making a time exposure which includes one or more complete cycles of variation of luminous intensity corresponding to one or more complete periods of the sonic signals produced by source 19.

Figure 2:
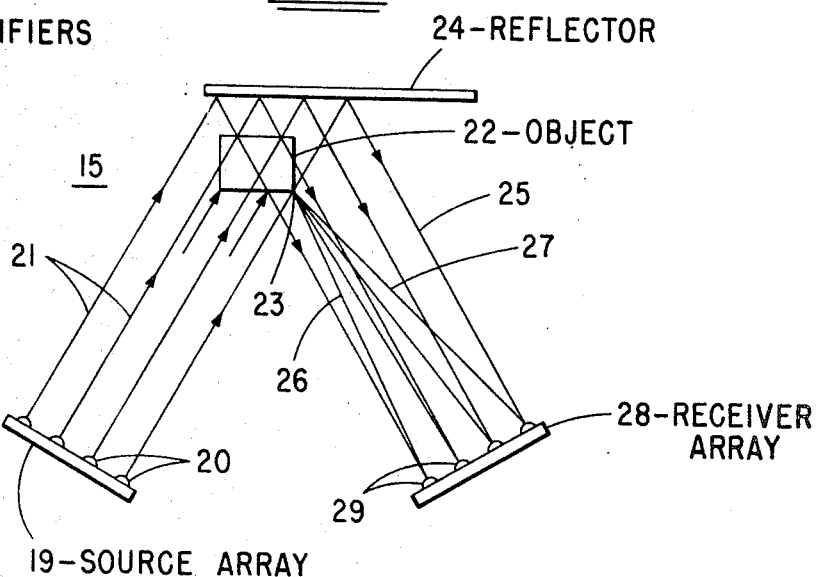

In FIGURE 2 is shown a plan view of the embodiment of FIGURE 1. As the source array 19 of transducers 20 sends out a substantially plane wave beam 21, this requires that the linear dimensions of array 19 be equivalent to many wave lengths of the sonic signal in water 15. Reflector 24 is a plane wall of any material which reflects a substantial part of the sonic energy incident upon it, such material as rock, brick, metal, or perhaps wood, serving this purpose. In addition, the dimensions of reflector 24 should be comparable to those of detector array 28, which are themselves comparable to the dimensions of source array 19. The spacing of individual unit sources 20 and unit detectors 29 should preferably be a fraction of the sonic wave length, such as the order of $\frac{1}{10}$ or less of a wave length to a maximum of about ½ wave length, of the sonic signal in water 15. This is not critical, although the smaller and spacing of the individual units, and thus the greater the total number of transmitting and receiving transducers 20 and 29, the higher is the resolution of the resulting image on film 41.

With source 19 continuously emitting acoustic energy in a beam 21, reflector 24 returns a beam 25 of this energy to detector 28. Also, three-dimensional object 22, from all points of its surface of which the point 23 is a single example, reflects and scatters or diffracts the sonic energy incident upon it from source 19, some of this energy reaching detector 28 by paths 26 and 27. As will be apparent, the more extensive and diffused is the surface of object 22, the greater is the amount of scattered energy that returns from it to detector 28; also energy from each scattering or diffracting point or small area of object 22 returns to the entire surface of detector 28. Thus, each individual transducer 29 receives energy from reflector 24 and from all diffracting and reflecting points on the surface of object 22. The resulting sonic pressure, and corresponding light intensity of each individual luminous source 37, is thus the resultant of the sonic energy reaching the corresponding individual receiver 29 by all possible paths.

In FIGURE 4 is shown how the photographic film or record 41 is used to view the object 22 after exposure and development of the film. The film 41 now carries a pattern of transparent and opaque small areas or spots, each representing a corresponding one of detecting transducers 29, and by its photographic density or blackness represents the resultant intensity of sonic energy at the particular detector 29. This is a standing-wave pattern of intensity. Due to the coherence of the sonic energy of source 19, every interval of time equal to the period of this energy provides an identical resultant pressure at receiver 28, which represents the reflection and diffraction pattern of energy received from object 22, modulated or modified by the reference energy simultaneously received from source 19 via reflector 24. This film, or record 21, can then be called a hologram, by analogy with the corresponding system of wavefront reconstruction with coherent light. A description of the principles of wave-front reconstruction with visible, coherent light is given by E. N. Leith and Juris Upatnieks in Scientific American, June 1965, vol. 212, No. 6, in an article entitled "Photography by Laser."

If a hologram is viewed while illuminated by coherent light, a real and/or a virtual image of an object becomes visible to the eye or can be photographed. This is shown in FIGURE 4, where the laser 45 and the lens 46 provide a beam 49 of coherent light. Transparency or film 41 is placed in this beam. When the illuminated film 41 is viewed from a proper position, such as along the line 50, a virtual image is formed at position 48 which can be focused by a lens 47 and photographed, or it can be viewed by an observer placing his eye at the position of lens 47.

The virtual image 48 shows the surface of object 22 in three dimensions. Object 22 may be a stationary underwater object such as an obstacle to shipping, for example, a rock projection or a sunken ship's hull. Or it may be a moving object, such as a submarine. In the latter case, a series of holograms or records must be made in the manner of a moving picture, photographically developed and viewed, to get a continuing picture of the movement of the object. If desired, the photographic record film 41 can be photochromic in nature, in which case the usual steps of photographic processing are not required. If it is then in the form of a movable strip or rotatable disc, which as soon as it is exposed as in FIGURES 1 and 3 to record the hologram, is then moved to a position for viewing as in FIGURE 4, the object becomes immediately visible.

In FIGURES 1 and 2, the lengths of the two paths from source 19 to receiving array 28 by way of object 22 and by way of reflector 24, are approximately the same. This is a requirement for optimum performance, since the wave energy from a coherent source tends to lose its coherence as the distance increases. Thus, where the two paths for the object-reflected and the reference beams differ considerably in length, there may be lack of coherence between the radiation from the object and that in the reference beam. Without such coherence of these two beams, the standing-wave pattern, which is the hologram, will not be formed.

When the object to be visualized is at a great distance, many additional problems may arise. For example, there is a loss of intensity in the received radiation due to divergence, plus perhaps scattering and absorption in addition, all of which may contribute to a loss of coherence between the two beams of radiation. The present invention is particularly directed to this problem of holographically visualizing distance objects for which loss of coherence may occur, although the same principles can also be applied to the visualizing of less distant objects where the coherence is more or less adequate.

Figure 5:
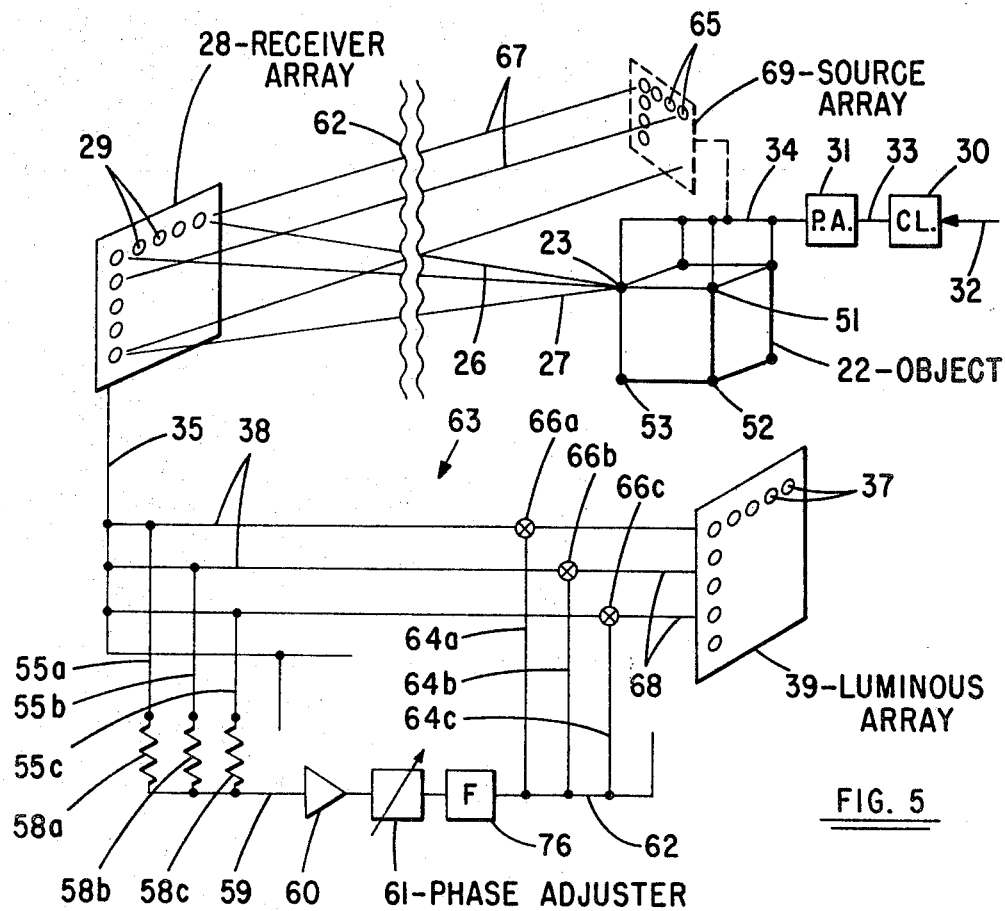
FIGURE 5 is a schematic diagram showing a preferred embodiment of the present invention.

In FIGURE 5 is shown a preferred embodiment of this invention. As in FIGURE 1, there is present an object 22 and a receiving array 28, but the distance between the two is assumed to be much greater than in FIGURE 1, as is indicated by the break lines 62 representing the omission of a large portion of the intervening space between the object 22 and receiving array 28. If the system of FIGURE 1 were to be used with the arrangement of object and receiving array of FIGURE 5, it can be assumed that the reconstructed image would not be satisfactory due to the great attenuation of the signal and the possible loss of coherence.

In FIGURE 5, the source of energy is moved from the vicinity of the receiving array 28 to the distant point in the vicinity of object 22. That is, power supply lead 32, frequency-control source 30, and power amplifier 31 at the location of object 22 are connected by leads 34 to a plurality of elastic-wave generating transducers 51, 52, 53 etc., placed at specific points on or characterizing the object 22. Whereas in FIGURE 1, energy from the source array 19 falling on the object 22 was reflected from its surfaces and diffracted from the corners of the object, such as corner 23, sources of coherent elastic-wave energy 51, 52, etc., are placed at the corners of the object 22. Since the energy of the transducers 51, 52, etc., is very much greater than that reflected and diffracted by object 22 in FIGURE 1, there is a considerably higher level of wave energy incident on receiving array 28 than if it had to traverse the two-way travel distance between the object and receiving array as in FIGURE 1. This higher level of signal provides an improved signal-to-noise ratio giving a much improved resolution in the final image.

With the power source 31 located near the distant object 22, it is possible to add an array of reference beam transducers, shown in dashed form, to act as a reference-wave energy source 69 when supplied with power from the same source 31 which supplies the object sources 51, 52, 53, etc. Source 69 then irradiates the receiving array by a reference beam 67. Although the paths 67 and 26, 27 will in general be the same, there may still be loss of coherence between the two beams at the receiving array 28 with resultant loss of the standing-wave pattern necessary for the hologram.

Alternatively, if electrical conductors can be provided to carry power from the distant source 31 to the receiving array 28, this energy may then be employed by electrical mixing with the electrical outputs of transducers 29, in the manner indicated, for example, in FIGURE 7 of my copending application S.N. 512,689. Because of the distance or due to other problems, however, it may not be feasible or possible to extend electrical conductors from the location of object 22 to receiving array 28, and it is this lack of either an electrical connection or of an adequate reference beam of wave energy that is overcome by the present invention.

As was true of FIGURE 1, the receiving array 28 in FIGURE 5 with separate transducers 29 converts the received-wave energy to electrical signals, which eventually control the intensity distribution of the luminous pattern on array 39. In FIGURE 5, however, the electrical signal utilized as the reference to be added to each of the individual transducer signals from array 28, as in my copending application S.N. 512,689, to provide biased signals for controlling the luminous display of array 39, is not available, so a substitute signal must be found.

As is shown in FIGURE 5, leads 38 connect to and carry individual electrical signals from each of transducer units 29. Each of the leads 38 is tapped by a corresponding lead 55a, 55b, etc. connected to a high resistance 58a, 58b, etc. These resistances 58 are connected together to a lead 59 and thence to an amplifier 60 and phase-shifting means 61. The signal output of phase shifter 61 on lead 62 is carried by individual leads 64a, 64b, etc., to adders 66a, 66b, etc., one in each of the leads 38. The outputs of adders 66 then go by leads 68 to the corresponding units of transducers 37 in luminous array 39. A filter 76 in lead 62 for a purpose described below may be disregarded here, or assumed to pass the biased signals without modification.

While the luminous array 39 is shown as having separate luminous sources or transducers 37, this is by way of example only, and any means known in the art, such as flying spots, cathode-ray tubes, and the like, can be used to create the pattern of light intensity distribution for photographic recording as a hologram. The receiving array 28 is likewise only represented schematically and by way of example as a two-dimensional transducer array, whereas it can comprise a single or limited number of transducers which occupy successive positions or are scanned over the area of the receiving array, as shown in my copending application S.N. 606,690.

The action of the high resistances 58 is to provide on lead 59 a signal which is the sum of all the separate signals on individual leads 38. Since each of the signals is a vector representing in magnitude, frequency and phase relative to other signals, the coherent wave signals incident on each corresponding one of transducers 29, the sum of all these signals on lead 59 is also a vector having the same frequency and a constant magnitude and phase, assuming the pattern of waves on detector array 28 is truly steady-state. Accordingly, the signal on lead 59, amplified and phase-adjusted, if desired, is a suitable reference signal for addition to or combining with each of the individual transducer signals to provide biased received signals with which to control the luminous array 39.

It is not necessary to include the signals of all transducers 29 in the summation signal on lead 59, as any lesser number will provide a usable reference, even a single transducer 29. The summation of as many as possible, however, is to be preferred for the reason that noise that may seriously affect any single transducer tends to be averaged out in the summation.

Figure 6:
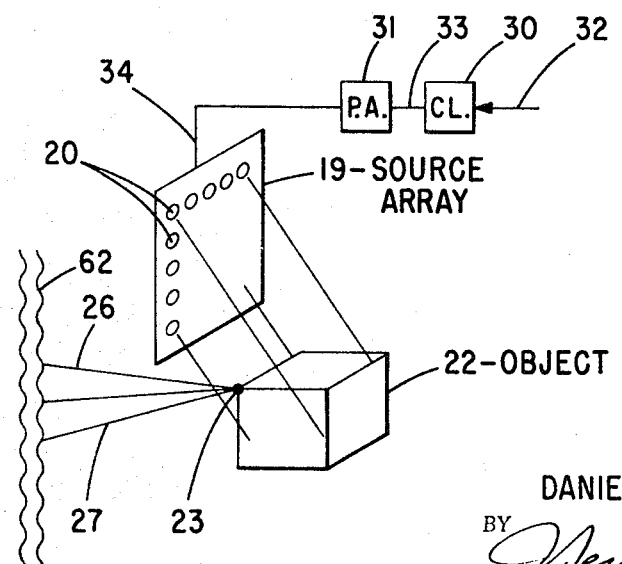
FIGURE 6 is a schematic diagram of a modification of a portion of the system of FIGURE 5.

A modification of the embodiment of FIGURE 5 is shown in FIGURE 6, where the object 22 instead of being outlined by sources 50, 51, 52, etc., is irradiated from a nearby source array 19 with transducers 20 supplied with power from the amplifier 31. This source arrangement provides high-intensity reflection and diffraction wave energy at the surface of the object, as compared to the configuration of FIGURE 1, in which the source 19 is generally located at the position of the receiving array and is thus quite distant from the object 22. Accordingly, the system of FIGURE 6 has approximately half the total attenuation of wave signal that would be present in the system of FIGURE 1. Though not shown in detail, the receiving array 28 and the generation of the bias signal and biasing of the received signals for control of the luminous array 39 would be performed substantially as is shown in FIGURE 5.

A further modification of the embodiment of FIGURE 5 is shown in FIGURE 7. Besides the distant object 22, there is a second distant object 22′ representing any number of additional objects which may be assumed to be unconnected with and some distance away from the object 22 and the receiving array 28. Object 22′ has its own power supply 31′ and frequency from that of source generally be of a different frequency from that of source 30. The reference means 63 of FIGURE 7 may simply comprise the leads 55a, 55b, the adding resistors 58a, 58b, etc., the amplifier 60, the phase shifter 61, and adders 66a, 66b, etc., of FIGURE 5. Under the conditions of operation shown in FIGURE 7, the transducers, say $f_1$ and $f_2$. When these signals are added, the summation current in lead 59 will comprise two currents of the same two frequencies, as will the output in lead 62 to be added into each of the leads 68 extending to luminous array 39. As each lead 68 will also contain signals of the two frequencies $f_1$ and $f_2$, there will thus be two superimposed patterns of illumination on the array 39:

(1) The two signals of frequency $f_1$ will combine to give a standing-wave pattern of frequency $f_1$;

(2) The two signals of frequency $f_2$ will likewise combine to give a standing wave pattern of frequency $f_2$.

There will thus be recorded simultaneously on the photographic film two holograms, one in frequency $f_1$ and the other frequency $f_2$. If the developed film or hologram is then illuminated by coherent light, as in FIGURE 4, the two images of objects 22 and 22′ will be reconstructed simultaneously.

By a further modification of FIGURE 5, either of the two objects 22 and 22′ can be viewed separately. By passing the output of phase shifter 61 through a band pass filter 76, unable to pass either $f_1$ or $f_2$, the frequency $f_1$ or $f_2$ present on leads 68, which is not biased due to its being excluded by filter 76 from the adders 66, will produce no standing-wave pattern and no hologram. That is, with filter 76 tuned to pass only $f_1$, only the hologram of the object illuminated by elastic waves of the frequency $f_1$ will become visible upon reconstruction.

If there is relative motion between the object 22 and the receiver array 28, there will be a Doppler frequency-shifting effect, so that the frequency of the received-wave signals at 28 will not be the same as the frequency transmitted under control of the source 30. Therefore, even if an electrical conductor were available to transmit the source frequency to the receiver, this signal could not be used as the reference signal, and the method of deriving the reference at the receiver location by summation is one way this hologram can be recorded for a moving object or receiver.

In my copending application S.N. 606,690, it is pointed out how the received signals from the transducer array 28 need not be immediately transformed into a corresponding light-intensity pattern, but may be reproducibly recorded for later playback and processing. One additional track was utilized for recording the reference signal. In the present invention, this reference signal is not required to be separately recorded, but is recovered during playback, as shown in FIGURES 8 and 9.

In these figures, the receiving array 28, cable 35 and leads 38 correspond to those of FIGURE 5. Each of leads 38 extends to a corresponding one of an array of heads 102 recording tracks 101 on a magnetic medium 100 moving in the direction of the arrow 104. This is all that is required to place the holographic data in storage.

Figure 9:
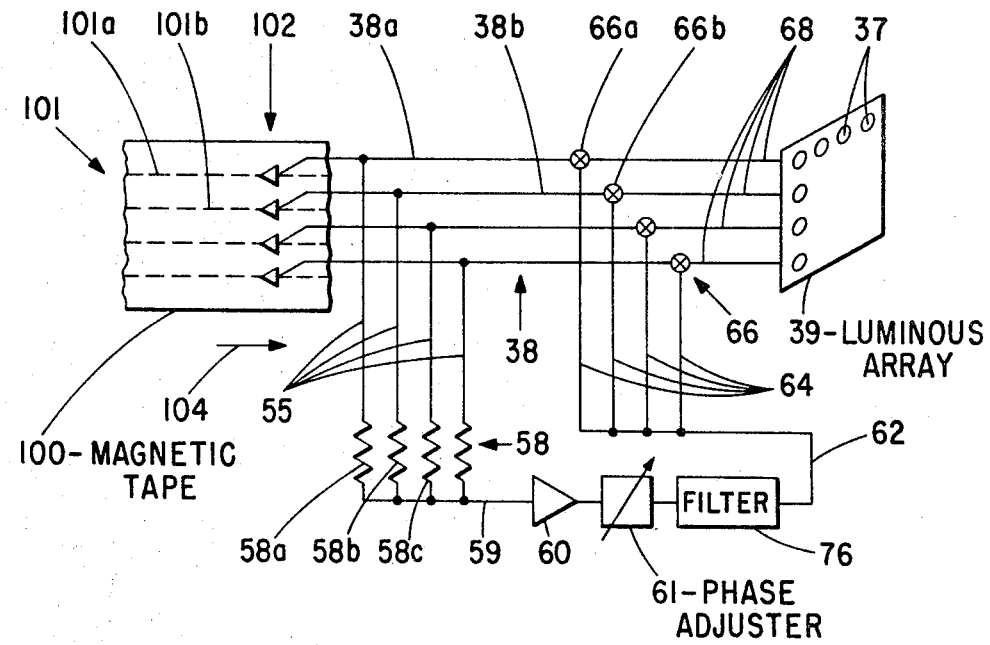
FIGURE 9 is a schematic diagram of the system for producing a hologram from data recorded as in FIGURE 8.

The translation of the stored signals to a luminous-intensity pattern is carried out as shown in FIGURE 9. Heads 102, acting as playback transducers, pick up the signals recorded on tracks 101 from magnetic tape 100, and the individual signals on leads 38a, 38b, and so on, are transmitted directly through adding circuits 66, as well as to the addition resistors 58, just as in FIGURE 5. Biased signals for recording over leads 68 by the individual units 37 of luminous array 39 are provided by playback from the tracks 101, just as in the direct transmission from the acoustic-receiving array 28 to the luminous-intensity array 39 in FIGURE 5.

Figure 8:
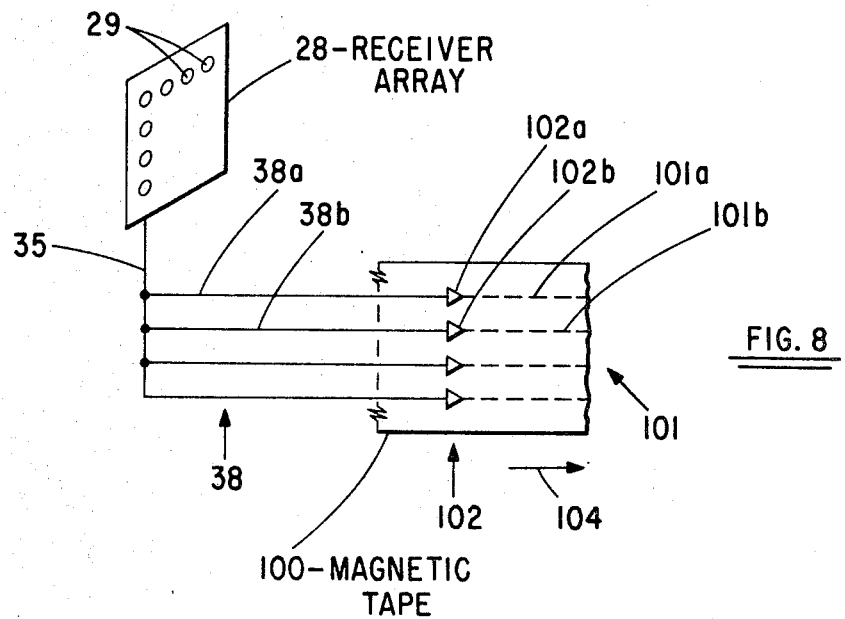
FIGURE 8 is a schematic diagram of an embodiment of the invention utilizing reproducible signal recording.

The embodiment shown in FIGURES 8 and 9 utilizes a multi-element receiving array with simultaneous reception and recording of all receivers. It is possible, of course, to sweep a reduced number of receivers over a prescribed space pattern and to record their outputs sequentially, in accordance with their changing position. Such sequentially recorded signals can be played back later to provide the biased received signals for photographic recording.

While I have described in detail a number of embodiments and modifications of my invention, still further embodiments will be apparent to those skilled in the art utilizing the principles disclosed herein. It should not be considered as limited to the specific details described, but is properly to be determined by the scope of the appended claims.

I claim:
1. In the method of forming a visual image of a three-dimensional object immersed in an elastic-wave transmitting medium, the improvement comprising the steps of
causing a plurality of areas of said object to emit coherent elastic waves into said medium, said areas being distributed over said object in a manner characterizing it,
receiving a portion of said wave energy from each of said areas at points in a receiving areal array,
converting said received wave energy into corresponding electrical energy at each of said receiving points,
summing the electrical outputs from a plurality of said receiving points into a summation electrical signal biasing the electrical output from each of said receiving points by combining it with said summation signal, to produce a corresponding plurality of biased receiver outputs, and applying said biased receiver outputs to control and produce a corresponding two-dimensional luminous intensity distribution over an area corresponding to said receiving areal array, said intensity distribution being adapted for translation into a hologram that can be illuminated with coherent light to create a visual image of said object.

2. The improvement of claim 1 in which said step of causing areas of said object to emit coherent elastic waves comprises attaching a plurality of elastic-wave emitting transducers to said object at a corresponding plurality of positions characterizing said object, and actuating said transducers from a single source of constant-frequency alternating electrical power.

3. The improvement of claim 1 in which said step of causing areas of said object to emit coherent elastic waves comprises attaching a plurality of elastic-wave emitting transducers to said object at a corresponding plurality of positions characterizing said object, and actuating said transducers from a plurality of sources of alternating electrical power, each of a different constant frequency.

4. The improvement of claim 3 including the further step of passing said summation signal through a bandpass filter tuned to pass at least one but less than all of said different constant frequencies prior to said biasing step.

5. The improvement of claim 1 in which said step of causing areas of said object to emit coherent elastic waves comprises positioning an array of elastic wave emitting transducers in said medium near said object at a spacing which is small compared to the distance between said object and said receiver array, and actuating said transducers from a single source of constant frequency alternating electrical power to cause said areas to strongly reflect said elastic waves in the direction of said receiving array.

6. The improvement of claim 1 including the steps of making a reproducible recording of said corresponding electric energy of said receiving points, and reproducing said recording as a corresponding plurality of electrical signals as input to said summing and biasing steps.

7. In apparatus for producing a hologram of a three-dimensional object in an elastic-wave transmitting medium, by translating coherent elastic waves received from said object into a transparency suitable for illumination by coherent light to create a visual image of said object, the improvement comprising a source of coherent elastic waves comprising a plurality of areas radiating said waves into said medium and distributed over said object in a manner characterizing it, receiving transducer means, located at a substantial distance from said source and oriented to receive, at points in an areal receiving array, elastic waves radiated from said object, for converting said received elastic waves into corresponding electrical signals, summing means connected to the outputs of a plurality of said receiving transducer means to produce a summation electric signal, means for combining said summation signal with each of said corresponding electrical signals to produce a corresponding plurality of biased signals, and light-emitting means responsive to said biased signals for producing an areal pattern of light intensity corresponding to said areal receiving array, from which pattern said transparency can be produced.

8. The improvement of claim 7 in which said source comprises a plurality of areas distributed over said object, at least part of said areas radiating into said medium coherent elastic waves of a frequency different from the coherent-wave frequencies radiated by others of said areas.

9. The improvement of claim 8 in which said summing of said combining means includes bandpass filter means to pass only part of said coherent-wave frequencies and to exclude other coherent-wave frequencies in said biased signals.

10. The improvement as in claim 7 in which said source comprises an array of source transducers close to and irradiating strongly reflecting areas of said object.

11. The improvement as in claim 10 including a single source of constant-frequency electrical power connected to drive said source transducers in synchronism.

12. The improvement as in claim 10 including a plurality of sources of constant-frequency electrical power, each of a different frequency and connected to a different source-transducer array to produce coherent radiation from different corresponding object areas.

13. The improvement as in claim 7 including means to record each of said corresponding electrical signals as a reproducible trace on a record medium, and means for reproducing said traces from said record medium as corresponding electrical signals into said summing and combining means.

References Cited

Caulfield et al., Local Reference Beam Generation in Holography, Proceedings of the IEEE, October, 1967, p. 1758.

Preston and Kreuzer, Ultrasonic Imaging Using a Synthetic Holographic Technique, From Applied Physics Letters, vol. 10, No. 5, Mar. 1, 1967, p. 150.

BENJAMIN A. BORSHELT, *Primary Examiner.*

G. H. GLANZMAN, *Assistant Examiner.*

U.S. Cl. X.R.

340—5

UNITED STATES PATENT OFFICE
CERTIFICATE OF CORRECTION

Patent No. 3,450,225

June 17, 1969

Daniel Silverman

It is certified that error appears in the above identified patent and that said Letters Patent are hereby corrected as shown below:

Column 1, line 55, "raditaion" should read -- radiation --; line 59, "Alternately" should read -- Alternatively --; line 60, "souce" should read -- source --. Column 2, line 39, "patern" should read -- pattern --. Column 4, line 45, "and spacing" should read -- the spacing --. Column 5, line 60, "distance" should read -- distant --. Column 7, line 49, "power supply 31' and frequency from that of source" should read -- power supply 31' and frequency source 30' which will --; lines 55 and 56, cancel "the transducers, say $f_1$ and $f_2$" and insert -- the transducers 29 of array 28 receive coherent wave signals ( two frequencies, say $f_1$ and $f_2$ --. Column 8, line 1, "unable" should read -- tunable --. Column 10, line 26, "of" should read -- or --.

Signed and sealed this 24th day of March 1970.

(SEAL)

Attest:

Edward M. Fletcher, Jr.

Attesting Officer

WILLIAM E. SCHUYLER, JR.

Commissioner of Patents